United States Patent
Ikeyatsu et al.

(10) Patent No.: US 11,769,866 B2
(45) Date of Patent: Sep. 26, 2023

(54) BINDER AQUEOUS SOLUTION INCLUDING COPOLYMER OF (METH)ACRYLAMIDE AND ALKOXYALKYL (METH)ACRYLATE, SLURRY INCLUDING THE SAME, NEGATIVE ELECTRODE, AND LITHIUM-ION BATTERY

(71) Applicant: ARAKAWA CHEMICAL INDUSTRIES, LTD., Osaka (JP)

(72) Inventors: Katsuhiko Ikeyatsu, Osaka (JP); Shinji Ozaki, Osaka (JP); Hideki Goda, Osaka (JP)

(73) Assignee: ARAKAWA CHEMICAL INDUSTRIES, LTD., Osaka (JP)

( * ) Notice: Subject to any disclaimer, the term of this patent is extended or adjusted under 35 U.S.C. 154(b) by 275 days.

(21) Appl. No.: 17/020,823

(22) Filed: Sep. 15, 2020

(65) Prior Publication Data
US 2021/0083262 A1    Mar. 18, 2021

(30) Foreign Application Priority Data

Sep. 17, 2019    (JP) ................. 2019-168599

(51) Int. Cl.
| | | |
|---|---|---|
| *H01M 4/04* | (2006.01) | |
| *H01M 4/62* | (2006.01) | |
| *H01M 10/0525* | (2010.01) | |
| *H01M 4/02* | (2006.01) | |

(52) U.S. Cl.
CPC ......... *H01M 4/0416* (2013.01); *H01M 4/622* (2013.01); *H01M 10/0525* (2013.01); *H01M 2004/021* (2013.01)

(58) Field of Classification Search
CPC ............................ H01M 4/0416; H01M 4/622
USPC ......................................................... 429/217
See application file for complete search history.

(56) References Cited

U.S. PATENT DOCUMENTS

| | | | |
|---|---|---|---|
| 2018/0102542 A1 | 4/2018 | Matsuzaki et al. | |
| 2020/0411870 A1* | 12/2020 | Adachi | ................. C08L 33/08 |

FOREIGN PATENT DOCUMENTS

| | | | | |
|---|---|---|---|---|
| CN | 104926184 A | * | 9/2015 | |
| CN | 107151285 A | * | 9/2017 | ............ C08F 220/06 |
| JP | 09151216 A | * | 6/1997 | |
| JP | 5708872 B1 | * | 4/2015 | .......... H01M 2/1653 |
| JP | 2015106488 | | 6/2015 | |
| JP | 2015106488 A | * | 6/2015 | |
| JP | 2015118908 | | 6/2015 | |
| JP | 2018006334 A | * | 1/2018 | |
| JP | 2019110002 A | * | 7/2019 | |
| KR | 20130096314 | | 8/2013 | |
| KR | 20160020283 | | 2/2016 | |
| KR | 20170084117 | | 7/2017 | |
| KR | 20180054511 | | 5/2018 | |
| KR | 20180068964 | | 6/2018 | |
| KR | 20190074228 | | 6/2019 | |
| WO | 2015098507 | | 7/2015 | |

OTHER PUBLICATIONS

"Search Report of Europe Counterpart Application", dated Dec. 23, 2020, p. 1-p. 8.
Zhixiong Yang, et al., "Polyelectrolyte Binder for Sulfur Cathode To Improve the Cycle Performance and Discharge Property of Lithium-Sulfur Battery," ACS Applied Materials & Interfaces, Apr. 2018 , pp. 13519-13527.
"Office Action of Korea Counterpart Application", dated Oct. 30, 2020, with English translation thereof, p. 1-p. 6.
"Office Action of Korea Counterpart Application", dated Mar. 29, 2021, with English translation thereof, pp. 1-7.
"Written prior art research report (for priority review) of Korea Counterpart Application", issued on Sep. 24, 2020, with English translation thereof, pp. 1-6.

* cited by examiner

*Primary Examiner* — Sean P Cullen
(74) *Attorney, Agent, or Firm* — JCIPRNET

(57) ABSTRACT

Provided are a binder aqueous solution for a lithium-ion battery, a slurry for a lithium-ion battery negative electrode, a negative electrode for a lithium-ion battery, and a lithium-ion battery. The binder aqueous solution for a lithium-ion battery contains a water-soluble poly(meth)acrylamide (A). The water-soluble poly(meth)acrylamide (A) is a polymer of a monomer group containing, with respect to 100 mol % of the monomer group, 30 mol % to 95 mol % of a (meth)acrylamide group-containing compound (a), and 5 mol % to 40 mol % of an alkoxyalkyl (meth)acrylate (b) represented by the following general formula (1), $$CH_2=C(R^1)-CO-O-R^2-O-R^3 \quad (1)$$

(in which $R^1$ is a hydrogen atom or a methyl group, $R^2$ is an alkylene group having 1 to 4 carbon atoms, $R^3$ is an alkyl group having 1 to 4 carbon atoms, and a total number of carbon atoms of the groups $R^1$, $R^2$ and $R^3$ is 5 or less.)

4 Claims, No Drawings

BINDER AQUEOUS SOLUTION INCLUDING COPOLYMER OF (METH)ACRYLAMIDE AND ALKOXYALKYL (METH)ACRYLATE, SLURRY INCLUDING THE SAME, NEGATIVE ELECTRODE, AND LITHIUM-ION BATTERY

CROSS-REFERENCE TO RELATED APPLICATION

This application claims the priority benefit of Japan Application No. 2019-168599, filed on Sep. 17, 2019. The entirety of the above-mentioned patent application is hereby incorporated by reference herein and made a part of this specification.

BACKGROUND

Technical Field

The disclosure relates to a binder aqueous solution for a lithium-ion battery, a slurry for a lithium-ion battery negative electrode, a negative electrode for a lithium-ion battery, and a lithium-ion battery.

Related Art

Lithium-ion batteries have a small size, light weight and high energy density, and further, are repeatedly chargeable and dischargeable, and are used in a wide range of applications. Hence, in recent years, improvements to battery members such as electrodes have been studied with the aim of improving the performance of lithium-ion batteries.

The positive electrode and negative electrode of a lithium-ion battery are both produced in the following manner. A slurry prepared by dispersing an electrode active material and a binder resin in a solvent is applied on both sides of a current collector (for example, a metal foil), and after the solvent is dried and removed to form an electrode layer, the resultant is compression-molded by a roll press machine or the like.

In recent years, in an electrode for a lithium-ion battery, various electrode active materials have been proposed from the viewpoint of increasing battery capacity. However, depending on the electrode active material, the electrode for a lithium-ion battery is likely to expand and contract with charging and discharging. Hence, the electrode for a lithium-ion battery that is likely to expand and contract with charging and discharging undergoes a volume change (springback) from the initial stage of repetition of charging and discharging, and a lithium-ion battery using the above electrode is likely to deteriorate in electrical characteristics such as cycle characteristics.

Therefore, in this field, studies have been made to solve the above problem by binder resins. For example, it has been proposed that good charge and discharge characteristics can be obtained by using polyacrylamide (Patent Documents 1 and 2) as a binder of a water-soluble resin. In addition, with respect to expansion and contraction of an active material associated with charging and discharging, it has been proposed to suppress the expansion by adding a crosslinker to a particulate resin being a binder resin (Patent Document 3). The crosslinker usually causes a crosslinking reaction in the drying step after the slurry composition is applied to the current collector, and forms crosslinks between particles of the particulate resin or the like.

PATENT DOCUMENTS

[Patent Document 1] Japanese Patent Laid-open No. 2015-118908
[Patent Document 2] Japanese Patent Laid-open No. 2015-106488
[Patent Document 3] WO 2015/098507

However, when crosslinking is performed using a crosslinker, flexibility of the binder resin is reduced, and as a result, a problem may occur in which adhesion to the electrode is reduced.

Therefore, problems to be solved by the disclosure include to provide a binder aqueous solution for a lithium-ion battery, the binder aqueous solution imparting a good discharge capacity retention rate to a lithium-ion battery, good electrode flexibility and electrode adhesion to an electrode, and good storage stability to a slurry.

As a result of intensive studies, the inventors have found that the above problems can be solved by a water-soluble polymer containing a predetermined unsaturated monomer as a component.

SUMMARY

According to the disclosure, the following items are provided.
(Item 1)
A binder aqueous solution for a lithium-ion battery, containing: a water-soluble poly(meth)acrylamide (A) being a polymer of a monomer group containing, with respect to 100 mol % of the monomer group, 30 mol % to 95 mol % of a (meth)acrylamide group-containing compound (a), and 5 mol % to 40 mol % of an alkoxyalkyl (meth)acrylate (b) represented by the following general formula (1), $$CH_2=C(R^1)-CO-O-R^2-O-R^3 \quad (1)$$

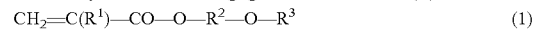

(in the formula, $R^1$ is a hydrogen atom or a methyl group, $R^2$ is an alkylene group having 1 to 4 carbon atoms, $R^3$ is an alkyl group having 1 to 4 carbon atoms, and a total number of carbon atoms of the groups $R^1$, $R^2$ and $R^3$ is 5 or less.)
(Item 2)
A slurry for a lithium-ion battery negative electrode, containing the binder aqueous solution for a lithium-ion battery as described in the above Item and a negative electrode active material.
(Item 3)
A negative electrode for a lithium-ion battery, obtained by applying the slurry for a lithium-ion battery negative electrode as described in the above Item to a current collector, and drying and curing the slurry.
(Item 4)
A lithium-ion battery including the negative electrode for a lithium-ion battery as described in the above Item.

In the disclosure, one or more of the features described above may be provided in combination in addition to the specified combinations.

The binder aqueous solution for a lithium-ion battery according to the disclosure is capable of imparting excellent storage stability to a slurry for a lithium-ion battery negative electrode. In addition, the slurry for a lithium-ion battery negative electrode according to the disclosure has excellent storage stability. Further, the electrode according to the disclosure has excellent flexibility and adhesion. The battery according to the disclosure has an excellent discharge capacity retention rate.

DESCRIPTION OF THE EMBODIMENTS

Throughout the disclosure, ranges of numerical values such as physical property values and content may be suitably set (for example, selected from the upper and lower limit values described in each item below). Specifically, regarding a numerical value α, when the upper limit and lower limit of the numerical value α are, for example, A4, A3, A2, and A1 (in which A4>A3>A2>A1), the numerical value α is in a range of, for example, A4 or less, A3 or less, A2 or less, A1 or more, A2 or more, A3 or more, A1 to A2, A1 to A3, A1 to A4, A2 to A3, A2 to A4, and A3 to A4.

[Binder Aqueous Solution for Lithium-Ion Battery: Also Referred to as Aqueous Solution]

The disclosure provides a binder aqueous solution for a lithium-ion battery, containing: a water-soluble poly(meth) acrylamide (A) being a polymer of a monomer group containing, with respect to 100 mol % of the monomer group, 30 mol % to 95 mol % of a (meth)acrylamide group-containing compound (a), and 5 mol % to 40 mol % of an alkoxyalkyl (meth)acrylate (b) represented by the following general formula (1), $$CH_2=C(R^1)-CO-O-R^2-O-R^3 \quad (1)$$

(in the formula, $R^1$ is a hydrogen atom or a methyl group, $R^2$ is an alkylene group having 1 to 4 carbon atoms, $R^3$ is an alkyl group having 1 to 4 carbon atoms, and a total number of carbon atoms of the groups $R^1$, $R^2$ and $R^3$ is 5 or less.)

<Water-Soluble Poly(Meth)Acrylamide: Also Referred to as Component (A)>

In the disclosure, "water-soluble" means having an insoluble content of less than 0.5% by mass (less than 2.5 mg) when 0.5 g of a compound thereof is dissolved in 100 g of water at 25° C.

In the case where the component (A) is not water-soluble, since it does not dissolve in water, no aqueous solution is formed at all. As a result, the component (A) does not contribute to dispersion of the slurry. In addition, viscosity required for application of the slurry to a current collector cannot be imparted to the slurry.

When 0.5 g of the component (A) is dissolved in 100 g of water, the insoluble content of the component (A) is, for example, less than 0.5% by mass, less than 0.4% by mass, less than 0.3% by mass, less than 0.2% by mass, less than 0.1% by mass, or 0% by mass.

In the disclosure, "poly(meth)acrylamide" means a (co) polymer obtained by polymerizing a monomer group containing a (meth)acrylamide group-containing compound.

In the disclosure, "(meth)acryl" means "at least one selected from the group consisting of acryl and methacryl." Similarly, "(meth)acrylate" means "at least one selected from the group consisting of acrylate and methacrylate." "(Meth)acryloyl" means "at least one selected from the group consisting of acryloyl and methacryloyl."

<(Meth)Acrylamide Group-Containing Compound (a): Also Referred to as Component (a)>

In the disclosure, "(meth)acrylamide group-containing compound" means a compound having a (meth)acrylamide group. As the (meth)acrylamide group-containing compound, various known ones may be used without particular limitation, and may be used singly or in combination of two or more.

In one embodiment, the (meth)acrylamide group-containing compound is expressed by the following structural formula:

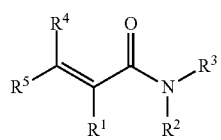

(In the formula, $R^1$ is a hydrogen atom or a methyl group; $R^2$ and $R^3$ are each independently a hydrogen atom, a substituted or unsubstituted alkyl group, or an acetyl group, or a group in which $R^2$ and $R^3$ form a ring structure together; $R^4$ and $R^5$ are each independently a hydrogen atom, a substituted or unsubstituted alkyl group, a hydroxy group, an amino group ($-NR^aR^b$ (in which $R^a$ and $R^b$ are each independently a hydrogen atom or a substituted or unsubstituted alkyl group), or an acetyl group. Examples of a substituent of the substituted alkyl group include hydroxy group, amino group, and acetyl group. In addition, examples of the group in which $R^2$ and $R^3$ form a ring structure together include morpholyl group.)

Examples of the alkyl group include linear alkyl group, branched alkyl group, and cycloalkyl group.

The linear alkyl group is expressed by a general formula of $-C_nH_{2n+1}$ (in which n is an integer of 1 or more). Examples of the linear alkyl group include methyl group, ethyl group, propyl group, n-butyl group, n-pentyl group, n-hexyl group, n-heptyl group, n-octyl group, n-nonyl group, and n-decamethyl group.

The branched alkyl group is a group in which at least one hydrogen of a linear alkyl group is substituted with an alkyl group. Examples of the branched alkyl group include i-propyl group, i-butyl group, s-butyl group, t-butyl group, diethylpentyl group, trimethylbutyl group, trimethylpentyl group, and trimethylhexyl group.

Examples of the cycloalkyl group include monocyclic cycloalkyl group, crosslinked cyclic cycloalkyl group, and condensed cyclic cycloalkyl group.

In the disclosure, "monocyclic" means having a cyclic structure formed by covalent bonding of carbons and without crosslinking structure therein. "Condensed cyclic" means having a cyclic structure in which two or more single rings share two atoms (that is, only one side of each ring is shared (condensed) with each other). "Crosslinked cyclic" means having a cyclic structure in which two or more single rings share three or more atoms.

Examples of the monocyclic cycloalkyl group include cyclopentyl group, cyclohexyl group, cycloheptyl group, cyclodecyl group, and 3,5,5-trimethylcyclohexyl group.

Examples of the crosslinked cyclic cycloalkyl group include tricyclodecyl group, adamantyl group, and norbornyl group.

Examples of the condensed cyclic cycloalkyl group include bicyclodecyl group.

Examples of the above (meth)acrylamide group-containing compound (a) include (meth)acrylamide, N-isopropyl (meth)acrylamide, N,N-dimethyl(meth)acrylamide, N,N-diethyl(meth)acrylamide, N,N-dimethylaminopropyl(meth) acrylamide, N-methylol(meth)acrylamide, diacetone(meth) acrylamide, maleic acid amide, (meth)acrylamide t-butylsulfonic acid, (meth)acryloylmorpholine, hydroxyethyl(meth)acrylamide, and a salt thereof. Examples of the above salt include dimethylaminopropyl(meth)acrylamide methyl chloride quaternary salt, and dimethylaminoethyl (meth)acrylate benzyl chloride quaternary salt. Among them, when (meth)acrylamide especially acrylamide is used, a binder can be prepared which has high water solubility, has a high interaction with an electrode active material, and improves slurry dispersibility or a binding property between electrode active materials inside an electrode.

The upper limit and lower limit of the content of the (meth)acrylamide group-containing compound with respect to 100 mol % of the monomer group are, for example, 95 mol %, 90 mol %, 85 mol %, 80 mol %, 75 mol %, 70 mol %, 65 mol %, 60 mol %, 55 mol %, 50 mol %, 45 mol %, 40 mol %, 35 mol %, and 30 mol %. In one embodiment, the above content preferably ranges from 30 mol % to 95 mol %.

The upper limit and lower limit of the content of the (meth)acrylamide group-containing compound with respect to 100% by mass of the monomer group are, for example, 95% by mass, 90% by mass, 85% by mass, 80% by mass, 75% by mass, 70% by mass, 65% by mass, 60% by mass, 55% by mass, 50% by mass, 45% by mass, 40% by mass, 35% by mass, 30% by mass, 25% by mass, and 20% by mass. In one embodiment, the content of the (meth)acrylamide group-containing compound with respect to 100% by mass of the monomer group is preferably 20% by mass to 95% by mass.

<Alkoxyalkyl (Meth)Acrylate (b): Also Referred to as Component (b)>
A component (b) is a compound represented by the following general formula (1), $$CH_2=C(R^1)—CO—O—R^2—O—R^3 \quad (1)$$

(in the formula, $R^1$ is a hydrogen atom or a methyl group, $R^2$ is an alkylene group having 1 to 4 carbon atoms, $R^3$ is an alkyl group having 1 to 4 carbon atoms, and a total number of carbon atoms of the groups $R^1$, $R^2$ and $R^3$ is 5 or less.) As the above alkoxyalkyl (meth)acrylate, various known ones may be used without particular limitation, and may be used singly or in combination of two or more.

The upper limit and lower limit of the total number of carbon atoms of the groups $R^1$, $R^2$ and $R^3$ are, for example, 5, 4, 3, and 2. In one embodiment, the total number of carbon atoms of the groups $R^1$, $R^2$ and $R^3$ is defined as 5 or less from the viewpoints of ensuring the water solubility and the availability of the component (A). The reason is that, when the total number of carbon atoms exceeds 5, the water solubility of the alkoxyalkyl (meth)acrylate decreases and it is difficult to ensure the water solubility of the component (A). In addition, from the viewpoint of further improving storage stability of a negative electrode slurry, flexibility and adhesion of a negative electrode, and a discharge capacity retention rate of a lithium-ion battery, the above number of carbon atoms is more preferably 4 or less. From the same viewpoint, the number of carbon atoms of $R^3$ is preferably 1.

Since the total number of carbon atoms of the groups $R^1$, $R^2$ and $R^3$ in general formula (1) is 5 or less, the storage stability of a negative electrode slurry, the flexibility and adhesion of a negative electrode, and the discharge capacity retention rate of a lithium-ion battery are improved. A reason thereof is as follows. The following is only one theory, and the disclosure is not intended to be bound thereby.

A monomer in which the total number of carbon atoms of the groups $R^1$, $R^2$ and $R^3$ in general formula (1) exceeds 5 is a hydrophobic monomer. When the component (A) is produced using such a hydrophobic monomer, the water solubility of the component (A) decreases. Hence, surface tension of an aqueous solution containing the component (A) decreases. As a result, when a slurry is produced using the aqueous solution containing the component (A), bubbles are likely to be generated. If the bubbles are generated, the following problems may occur.
(1) When the slurry is produced, blades of a disperser collide with the bubbles, and dispersion of the slurry does not proceed. As a result, the storage stability deteriorates.
(2) When the slurry containing the bubbles is applied to a current collector to produce an electrode, the electrode, after being dried and cured, may have holes caused by the bubbles. Cracking and peeling originate from the holes, and as a result, the electrode flexibility and the electrode adhesion decrease.

From the above, if the water solubility of the component (A) is improved, that is, if the total number of carbon atoms of the groups $R^1$, $R^2$ and $R^3$ is set to 5 or less, it is conceivable that the storage stability of a negative electrode slurry, the flexibility and adhesion of a negative electrode, and the discharge capacity retention rate of a lithium-ion battery be improved.

Combinations of the groups $R^1$, $R^2$ and $R^3$ are exemplified as follows.

TABLE 1

| $R^1$ | $R^2$ | $R^3$ | Total number of carbon atoms of groups $R^1$, $R^2$ and $R^3$ |
|---|---|---|---|
| —H | —$CH_2$— | —Me | 2 |
| —H | —$CH_2$— | —$CH_2$Me | 3 |
| —H | —$CH_2$— | —$CH_2CH_2$Me | 4 |
| —H | —$CH_2$— | —$CH(Me)_2$ | 4 |
| —H | —$CH_2$— | —$CH_2CH_2CH_2$Me | 5 |
| —H | —$CH_2$— | —$CH(Me)CH_2CH_3$ | 5 |
| —H | —$CH_2$— | —$CH_2CH(Me)_2$ | 5 |
| —H | —$CH_2$— | —$C(Me)_3$ | 5 |
| —H | —$CH_2CH_2$— | —$CH_3$ | 3 |
| —H | —$CH(Me)$— | —$CH_3$ | 3 |
| —H | —$CH_2CH_2$— | —$CH_2$Me | 4 |
| —H | —$CH(Me)$— | —$CH_2$Me | 4 |
| —H | —$CH_2CH_2$— | —$CH_2CH_2$Me | 5 |
| —H | —$CH(Me)$— | —$CH_2CH_2$Me | 5 |
| —H | —$CH_2CH_2$— | —$CH(Me)_2$ | 5 |
| —H | —$CH(Me)$— | —$CH(Me)_2$ | 5 |
| —H | —$CH_2CH_2CH_2$— | —Me | 4 |
| —H | —$CH_2CH(Me)$— | —Me | 4 |
| —H | —$CH(Me)CH_2$— | —Me | 4 |
| —H | —$C(Me)_2$— | —Me | 4 |
| —H | —$CH_2CH_2CH_2$— | —$CH_2$Me | 5 |
| —H | —$CH_2CH(Me)$— | —$CH_2$Me | 5 |
| —H | —$CH(Me)CH_2$— | —$CH_2$Me | 5 |
| —H | —$C(Me)_2$— | —$CH_2$Me | 5 |
| —H | —$CH_2CH_2CH_2CH_2$— | —Me | 5 |
| —H | —$CH(Me)CH_2CH_2$— | —Me | 5 |
| —H | —$CH_2CH(Me)CH_2$— | —Me | 5 |
| —H | —$CH_2CH_2CH(Me)$— | —Me | 5 |
| —H | —$CH_2C(Me)_2$— | —Me | 5 |
| —H | —$C(Me)_2CH_2$— | —Me | 5 |
| —Me | —$CH_2$— | —Me | 3 |
| —Me | —$CH_2$— | —$CH_2$Me | 4 |
| —Me | —$CH_2$— | —$CH_2CH_2$Me | 5 |
| —Me | —$CH_2$— | —$CH(Me)_2$ | 5 |
| —Me | —$CH_2CH_2$— | —Me | 4 |
| —Me | —$CH(Me)$— | —Me | 4 |
| —Me | —$CH_2CH_2$— | —$CH_2$Me | 5 |
| —Me | —$CH(Me)$— | —$CH_2$Me | 5 |
| —Me | —$CH_2CH_2CH_2$— | —Me | 5 |
| —Me | —$CH_2CH(Me)$— | —Me | 5 |
| —Me | —$CH(Me)CH_2$— | —Me | 5 |
| —Me | —$C(Me)_2$— | —Me | 5 |

Me: Methyl group (—$CH_3$)
In $R^2$, the left side is an ester bond side and the right side is an alkoxy group side.

Examples of the above alkoxyalkyl (meth)acrylate include methoxymethyl (meth)acrylate, 2-methoxyethyl (meth)acrylate, 1-methoxyethyl (meth)acrylate, 3-methoxypropyl (meth)acrylate, 2-methoxypropyl (meth)acrylate, 1-methoxypropyl (meth)acrylate, 4-methoxybutyl (meth)acrylate, 3-methoxybutyl (meth)acrylate, 2-methoxybutyl (meth)acrylate, 1-methoxybutyl (meth)acrylate, ethoxymethyl (meth)acrylate, 2-ethoxyethyl (meth)acrylate, 1-ethoxyethyl (meth)acrylate, 3-ethoxypropyl (meth)acrylate, 2-ethoxypropyl (meth)acrylate, 1-ethoxypropyl (meth)

acrylate, propoxymethyl (meth)acrylate, 2-propoxyethyl (meth)acrylate, 1-propoxyethyl (meth)acrylate, and butoxymethyl (meth)acrylate.

The upper limit and lower limit of the content of the above alkoxyalkyl (meth)acrylate with respect to 100 mol % of the monomer group are, for example, 40 mol %, 35 mol %, 30 mol %, 25 mol %, 20 mol %, 15 mol %, 10 mol %, 9 mol %, and 5 mol %. In one embodiment, the above content preferably ranges from 5 mol % to 40 mol %.

The upper limit and lower limit of the content of the above alkoxyalkyl (meth)acrylate with respect to 100% by mass of the monomer group are, for example, 60% by mass, 55% by mass, 50% by mass, 45% by mass, 40% by mass, 35% by mass, 30% by mass, 25% by mass, 20% by mass, 15% by mass, 10% by mass, and 5% by mass. In one embodiment, the content of the above alkoxyalkyl (meth)acrylate with respect to 100% by mass of the monomer group is preferably 5% by mass to 60% by mass.

<Unsaturated Organic Acid or Salt Thereof (c): Also Referred to as Component (c)>

In the disclosure, an unsaturated organic acid means a compound having an acidic group and a polymerizable unsaturated bond. The unsaturated organic acid may be used singly or in combination of two or more.

A salt of an unsaturated organic acid means a salt of the above unsaturated organic acid. The salt of the unsaturated organic acid may be used singly or in combination of two or more.

Examples of the unsaturated organic acid include unsaturated carboxylic acid, unsaturated sulfonic acid, and unsaturated phosphoric acid.

Examples of the unsaturated carboxylic acid include (meth)acrylic acid, crotonic acid, maleic acid, fumaric acid, and itaconic acid.

Examples of the unsaturated sulfonic acid include: $\alpha,\beta$-ethylenically unsaturated sulfonic acid, such as vinylsulfonic acid, styrenesulfonic acid, and (meth)allylsulfonic acid; (meth)acrylamide t-butylsulfonic acid, 2-(meth)acrylamide-2-methylpropanesulfonic acid, 2-(meth)acrylamide-2-hydroxypropanesulfonic acid, 3-sulfopropane(meth)acrylic ester, and bis-(3-sulfopropyl)itaconic ester.

Examples of the unsaturated phosphoric acid include vinylphosphonic acid, vinyl phosphate, bis((meth)acryloxyethyl) phosphate, diphenyl-2-(meth)acryloyloxyethyl phosphate, dibutyl-2-(meth)acryloyloxyethyl phosphate, dioctyl-2-(meth)acryloyloxyethyl phosphate, monomethyl-2-(meth)acryloyloxyethyl phosphate, and 3-(meth)acryloxy-2-hydroxypropanephosphoric acid.

In the disclosure, a compound corresponding to both a (meth)acrylamide group-containing compound and an unsaturated organic acid is regarded as an unsaturated organic acid.

Examples of a salt of an unsaturated organic acid include an inorganic salt of an unsaturated organic acid. An inorganic salt of an unsaturated organic acid refers to a salt whose cationic portion is a metal cation. Examples of an inorganic salt include alkali metal salt and alkaline earth metal salt.

Examples of the alkali metal include lithium, sodium, and potassium.

Examples of the alkaline earth metal include magnesium and calcium.

The upper limit and lower limit of the content of the unsaturated organic acid or a salt thereof with respect to 100 mol % of the monomer group are, for example, 40 mol %, 35 mol %, 30 mol %, 25 mol %, 20 mol %, 15 mol %, 10 mol %, 5 mol %, and 0 mol %. In one embodiment, the above content is preferably 0 mol % to 40 mol %, and more preferably 10 mol % to 40 mol % from the viewpoint of improving the water solubility and slurry dispersibility of the component (A).

The upper limit and lower limit of the content of the unsaturated organic acid or a salt thereof with respect to 100% by mass of the monomer group are, for example, 50% by mass, 45% by mass, 40% by mass, 35% by mass, 30% by mass, 25% by mass, 20% by mass, 15% by mass, 10% by mass, 5% by mass, and 0% by mass. In one embodiment, the content of the unsaturated organic acid or a salt thereof with respect to 100% by mass of the monomer group is preferably 0% by mass to 50% by mass.

<Hydroxyalkyl(Meth)Acrylate (d) Having Hydroxyalkyl Group Having 2 to 4 Carbon Atoms: Also Referred to as Component (d)>

As a component (d), various known ones may be used without particular limitation, and may be used singly or in combination of two or more.

In the disclosure, "hydroxyalkyl group having 2 to 4 carbon atoms" refers to a group in which one of hydrogen atoms constituting an alkyl group having 2 to 4 carbon atoms is substituted with a hydroxy group.

Examples of the hydroxyalkyl(meth)acrylate having a hydroxyalkyl group having 2 to 4 carbon atoms include 1-hydroxyethyl(meth)acrylate, 2-hydroxyethyl(meth)acrylate, 1-hydroxypropyl(meth)acrylate, 2-hydroxypropyl(meth)acrylate, 3-hydroxypropyl(meth)acrylate, 2-hydroxy-1-methylethyl(meth)acrylate, 1-hydroxy-2-methylethyl(meth)acrylate, 1-hydroxybutyl(meth)acrylate, 2-hydroxybutyl(meth)acrylate, 3-hydroxybutyl(meth)acrylate, 4-hydroxybutyl(meth)acrylate, 1-hydroxy-1-methylpropyl(meth)acrylate, 2-hydroxy-1-methyl-propyl(meth)acrylate, 3-hydroxy-1-methyl-propyl(meth)acrylate, 1-ethyl-2-hydroxyethyl(meth)acrylate, 1-hydroxy-2-methyl-propyl(meth)acrylate, 2-hydroxy-2-methyl-propyl(meth)acrylate, 3-hydroxy-2-methyl-propyl(meth)acrylate, and 1,1-dimethyl-2-hydroxyethyl(meth)acrylate.

The upper limit and lower limit of the content of the hydroxyalkyl(meth)acrylate having a hydroxyalkyl group having 2 to 4 carbon atoms with respect to 100 mol % of the monomer group are, for example, 40 mol %, 35 mol %, 30 mol %, 25 mol %, 20 mol %, 15 mol %, 10 mol %, 5 mol %, and 0 mol %. In one embodiment, the above content is preferably 0 mol % to 40 mol %, and more preferably 5 mol % to 40 mol % from the viewpoint of improving the water solubility and electrode flexibility of the component (A).

The upper limit and lower limit of the content of the hydroxyalkyl(meth)acrylate having a hydroxyalkyl group having 2 to 4 carbon atoms with respect to 100% by mass of the monomer group are, for example, 40% by mass, 35% by mass, 30% by mass, 25% by mass, 20% by mass, 15% by mass, 10% by mass, 5% by mass, and 0% by mass. In one embodiment, the content of the hydroxyalkyl(meth)acrylate (d) having hydroxyalkyl group having 2 to 4 carbon atoms with respect to 100% by mass of the monomer group is preferably 0% by mass to 40% by mass.

<$\alpha,\beta$-Unsaturated Nitrile (e): Also Referred to as Component (e)>

An $\alpha,\beta$-unsaturated nitrile may be used singly or in combination of two or more. The $\alpha,\beta$-unsaturated nitrile can be suitably used for the purpose of imparting flexibility to an electrode. Examples of the $\alpha,\beta$-unsaturated nitrile include (meth)acrylonitrile, $\alpha$-chloro(meth)acrylonitrile, $\alpha$-ethyl (meth)acrylonitrile, and vinylidene cyanide. Among them, (meth)acrylonitrile is preferable, and acrylonitrile is particularly preferable.

The upper limit and lower limit of the content of the α,β-unsaturated nitrile with respect to 100 mol % of the monomer group are, for example, 40 mol %, 35 mol %, 30 mol %, 25 mol %, 20 mol %, 15 mol %, 10 mol %, 5 mol %, and 0 mol %. In one embodiment, the above content is preferably 0 mol % to 40 mol %, and more preferably 5 mol % to 40 mol % from the viewpoint of improving the electrode flexibility.

The upper limit and lower limit of the content of the α,β-unsaturated nitrile with respect to 100% by mass of the monomer group are exemplified by 30% by mass, 25% by mass, 20% by mass, 15% by mass, 10% by mass, 5% by mass, and 0% by mass. In one embodiment, the content of the α,β-unsaturated nitrile (e) with respect to 100% by mass of the monomer group is preferably 0% by mass to 30% by mass.

<Relative Ratio of Monomer Components>

The upper limit and lower limit of a molar ratio [amount of substance of component (b)/amount of substance of component (a)] between the component (b) and the component (a) contained in the monomer group are, for example, 1.3, 1, 0.9, 0.5, 0.2, 0.1, 0.09, and 0.05. In one embodiment, the above molar ratio is preferably 0.05 to 1.3.

The upper limit and lower limit of a molar ratio [amount of substance of any one of the components (c) to (e)/amount of substance of component (a)] between any one of the components (c) to (e) and the component (a) contained in the monomer group are, for example, 1.3, 1, 0.9, 0.5, 0.2, 0.1, 0.09, 0.05 and 0. In one embodiment, the above molar ratio is preferably 0 to 1.3.

The upper limit and lower limit of a molar ratio [amount of substance of any one of the components (c) to (e)/amount of substance of component (b)] between any one of the components (c) to (e) and the component (b) contained in the monomer group are, for example, 8, 7, 6, 5, 4, 3, 2, 1, 0.9, 0.5, 0.2, 0.1, 0.09, 0.05, and 0. In one embodiment, the above molar ratio is preferably 0 to 8.

The upper limit and lower limit of a mass ratio [mass of component (b)/mass of component (a)] between the component (b) and the component (a) contained in the monomer group are, for example, 3, 2.5, 2, 1.5, 1, 0.9, 0.5, 0.2, 0.1, 0.09, and 0.05. In one embodiment, the above mass ratio is preferably 0.05 to 3.

The upper limit and lower limit of a mass ratio [mass of component (c)/mass of component (a)] between the component (c) and the component (a) contained in the monomer group are, for example, 2.5, 2, 1.5, 1, 0.9, 0.5, 0.2, 0.1, 0.09, 0.05, and 0. In one embodiment, the above mass ratio is preferably 0 to 2.5.

The upper limit and lower limit of a mass ratio [mass of component (d)/mass of component (a)] between the component (d) and the component (a) contained in the monomer group are, for example, 2, 1.5, 1, 0.9, 0.5, 0.2, 0.1, 0.09, 0.05, and 0. In one embodiment, the above mass ratio is preferably 0 to 2.

The upper limit and lower limit of a mass ratio [mass of component (e)/mass of component (a)] between the component (e) and the component (a) contained in the monomer group are, for example, 1.5, 1, 0.9, 0.5, 0.2, 0.1, 0.09, 0.05, and 0. In one embodiment, the above mass ratio is preferably 0 to 1.5.

The upper limit and lower limit of a mass ratio [mass of component (c)/mass of component (b)] between the component (c) and the component (b) contained in the monomer group are, for example, 10, 9, 8, 7, 6, 5, 4, 3, 2, 1.5, 1, 0.9, 0.5, 0.2, 0.1, 0.09, 0.05, and 0. In one embodiment, the above mass ratio is preferably 0 to 10.

The upper limit and lower limit of a mass ratio [mass of component (d)/mass of component (b)] between the component (d) and the component (b) contained in the monomer group are, for example, 8, 7, 6, 5, 4, 3, 2, 1.5, 1, 0.9, 0.5, 0.2, 0.1, 0.09, 0.05, and 0. In one embodiment, the above mass ratio is preferably 0 to 8.

The upper limit and lower limit of a mass ratio [mass of component (e)/mass of component (b)] between the component (e) and the component (b) contained in the monomer group are, for example, 6, 5, 4, 3, 2, 1.5, 1, 0.9, 0.5, 0.2, 0.1, 0.09, 0.05, and 0. In one embodiment, the above mass ratio is preferably 0 to 6.

<Monomers Corresponding to None of Components (a) to (e): Also Referred to as Other Components>

In the above monomer group, monomers (other components) that correspond to none of the components (a) to (e) may be used as long as the desired effects of the disclosure are not impaired. As the other components, various known ones may be used singly or in combination of two or more.

Examples of the other components include a hydroxyl group-free unsaturated carboxylic ester, a conjugated diene, and an aromatic vinyl compound.

The hydroxyl group-free unsaturated carboxylic ester is preferably a hydroxyl group-free (meth)acrylic ester. Examples of the hydroxyl group-free (meth)acrylic ester include a hydroxyl group-free linear (meth)acrylic ester, a hydroxyl group-free branched (meth)acrylic ester, a hydroxyl group-free alicyclic (meth)acrylic ester, and a hydroxyl group-free substituted (meth)acrylic ester.

Examples of the hydroxyl group-free linear (meth)acrylic ester include methyl (meth)acrylate, ethyl (meth)acrylate, n-propyl (meth)acrylate, n-butyl (meth)acrylate, n-amyl (meth)acrylate, hexyl (meth)acrylate, n-octyl (meth)acrylate, nonyl (meth)acrylate, and decyl (meth)acrylate.

Examples of the hydroxyl group-free branched (meth) acrylic ester include i-propyl (meth)acrylate, i-butyl (meth) acrylate, i-amyl (meth)acrylate, and 2-ethylhexyl (meth) acrylate.

Examples of the hydroxyl group-free alicyclic (meth) acrylic ester include cyclohexyl (meth)acrylate.

Examples of the hydroxyl group-free substituted (meth) acrylic ester include glycidyl (meth)acrylate, allyl (meth) acrylate, and ethylene di(meth)acrylate.

In addition, the above hydroxyl group-free substituted (meth)acrylic ester also includes an alkoxyalkyl (meth) acrylate other than the above alkoxyalkyl (meth)acrylate represented by general formula (1).

The hydroxyl group-free unsaturated carboxylic ester can be suitably used for the purpose of imparting flexibility to an electrode. From the above viewpoint, the content of the hydroxyl group-free unsaturated carboxylic ester with respect to 100 mol % of the above monomer group is preferably less than 40 mol % (for example, less than 30 mol %, less than 20 mol %, less than 19 mol %, less than 15 mol %, less than 10 mol %, less than 5 mol %, less than 1 mol %, or 0 mol %).

In addition, the content of the hydroxyl group-free unsaturated carboxylic ester with respect to 100% by mass of the above monomer group is preferably 40% by mass or less (for example, less than 30% by mass, less than 20% by mass, less than 19% by mass, less than 15% by mass, less than 10% by mass, less than 5% by mass, less than 1% by mass, or 0% by mass).

Examples of the conjugated diene include 1,3-butadiene, 2-methyl-1,3-butadiene, 2,3-dimethyl-1,3-butadiene, 2-chloro-1,3-butadiene, a substituted linear conjugated pentadiene, and a substituted and side chain conjugated hexadiene.

From the viewpoint of cycle characteristics of the lithium-ion battery, the content of the conjugated diene with respect to 100 mol % of the above monomer group is preferably less than 10 mol %, more preferably 0 mol %.

The upper limit and lower limit of the content of the conjugated diene with respect to 100% by mass of the above monomer group are, for example, 30% by mass, 20% by mass, 10% by mass, 5% by mass, 1% by mass, and 0% by mass. In one embodiment, the above content is preferably 0% by mass to 30% by mass.

In addition, examples of the aromatic vinyl compound include styrene, α-methylstyrene, p-methylstyrene, vinyltoluene, chlorostyrene, and divinylbenzene.

From the viewpoint of cycle characteristics of the lithium-ion battery, the content of the aromatic vinyl compound with respect to 100 mol % of the above monomer group is preferably less than 10 mol %, more preferably 0 mol %.

The upper limit and lower limit of the content of the aromatic vinyl compound with respect to 100% by mass of the above monomer group are, for example, 30% by mass, 20% by mass, 10% by mass, 5% by mass, 1% by mass, and 0% by mass. In one embodiment, the above content is preferably 0% by mass to 30% by mass.

A ratio of the other components than the hydroxyl group-free unsaturated carboxylic ester, the conjugated diene and the aromatic vinyl compound mentioned above in the above monomer group is, for example, less than 10 mol %, less than 5 mol %, less than 2 mol %, less than 1 mol %, less than 0.1 mol %, less than 0.01 mol %, or 0 mol %, with respect to 100 mol % of the above monomer group. In addition, with respect to 100% by mass of the above monomer group, the ratio of the other components is, for example, less than 10% by mass, less than 9% by mass, less than 7% by mass, less than 5% by mass, less than 4% by mass, less than 2% by mass, less than 1% by mass, less than 0.9% by mass, less than 0.5% by mass, less than 0.3% by mass, less than 0.1% by mass, less than 0.05% by mass, less than 0.01% by mass, or 0% by mass.

<Method for Preparing Component (A)>

The component (A) may be synthesized by various known polymerization methods, preferably a radical polymerization method. Specifically, it is preferable to add a radical polymerization initiator and, if necessary, a chain transfer agent, to a monomer mixture containing the aforementioned components, and, while stirring the mixture, perform a polymerization reaction at a reaction temperature of 50° C. to 100° C. The reaction time is not particularly limited and is preferably 1 hour to 10 hours.

As the radical polymerization initiator, various known ones may be used without particular limitation. Examples of the radical polymerization initiator include: a persulfate, such as potassium persulfate and ammonium persulfate; a redox polymerization initiator in which the above persulfate and a reductant such as sodium bisulfite are combined; and an azo initiator, such as 2,2'-azobis-2-amidinopropane dihydrochloride. The amount of the radical polymerization initiator used is not particularly limited, and is preferably 0.05% by mass to 5.0% by mass, more preferably 0.1% by mass to 3.0% by mass, with respect to 100% by mass of the monomer group that provides the component (A).

Before the radical polymerization reaction and/or when the obtained component (A) is dissolved in water, for the purpose of improving production stability, the pH of a reaction solution may be adjusted by a general neutralizer such as ammonia or organic amine, potassium hydroxide, sodium hydroxide, and lithium hydroxide. In this case, the pH is preferably 2 to 11. For the same purpose, it is also possible to use ethylene diamine tetraacetic acid (EDTA), which is a metal ion sealant, or a salt thereof, or the like.

If the component (A) has an acid group, it can be used by a neutralization ratio thereof being appropriately adjusted (a neutralization ratio of 100% indicating that neutralization is performed by an alkali having the same number of moles as the acid component contained in the component (A); a neutralization ratio of 50% indicating that neutralization is performed by an alkali having half the number of moles of the acid component contained in the component (A)) depending on the use. The neutralization ratio when the electrode active material is dispersed is not particularly limited. In one embodiment, the neutralization ratio is preferably 95% to 100% after formation of a coating layer or the like. 95% or more is preferable from the viewpoint of preventing a decrease in initial capacity, and 100% or less is preferable from the viewpoint of preventing hydrolysis. Examples of a neutralized salt include Li salt, Na salt, K salt, ammonium salt, Mg salt, Ca salt, Zn salt, and Al salt.

In one embodiment, the component (A) is preferably an inorganic salt. The inorganic salt as the component (A) refers to a salt whose cationic portion is a metal cation. Examples of the inorganic salt include those mentioned above.

<Physical Properties of Component (A)>

The upper limit and lower limit of a glass transition temperature of the component (A) are, for example, 160° C., 155° C., 150° C., 145° C., 140° C., 135° C., 130° C., 125° C., 120° C., 115° C., 110° C., 105° C., 100° C., 95° C., 90° C., 85° C., 80° C., 75° C., 70° C., 65° C., 60° C., 55° C., 50° C., 45° C., 40° C., 35° C., 30° C., 25° C., 20° C., 15° C., 10° C., 5° C., and 0° C. In one embodiment, 0° C. or higher is preferable, and 30° C. or higher is more preferable from the viewpoints of mechanical strength and heat resistance.

The glass transition temperature of the component (A) may be adjusted by a combination of monomers. The glass transition temperature of the component (A) can be calculated from glass transition temperatures (Tg) (absolute temperature: K) of homopolymers of the monomers and mass fractions thereof based on the Fox equation shown below.

$$1/Tg=(W_1/Tg_1)+(W_2/Tg_2)+(W_3/Tg_3)+\ldots+(W_n/Tg_n)$$

[In the equation, Tg indicates the glass transition temperature (K) of the polymer to be calculated, $W_1$ to $W_n$ each indicate a mass fraction of each monomer, and $Tg_1$ to $Tg_n$ each indicate the glass transition temperature (K) of a homopolymer of each monomer.]

For example, the glass transition temperature is 165° C. in the case of a homopolymer of acrylamide, is 106° C. in the case of a homopolymer of acrylic acid, is −15° C. in the case of a homopolymer of hydroxyethyl acrylate, and is 105° C. in the case of a homopolymer of acrylonitrile. In order to obtain the component (A) having a desired glass transition temperature, the monomer composition constituting the component (A) can be determined. Moreover, the glass transition temperature of a homopolymer of a monomer can be measured by a differential scanning calorimeter (DSC), a differential thermal analyzer (DTA), a thermomechanical measurement apparatus (TMA) or the like under the condition that the temperature is raised from −100° C. to 300° C. (at a temperature rising rate of 10° C./min). Moreover, values described in a literature may also be used. Examples of the literature include page 325 of "Handbook of Chemistry: Pure Chemistry II" (Revised 5th Edition) edited by the Chemical Society of Japan.

A weight average molecular weight (Mw) of the component (A) is not particularly limited, and its upper limit and lower limit are, for example, 7,000,000, 6,500,000, 6,000,000, 5,500,000, 5,000,000, 4,500,000, 4,000,000, 3,500,000, 3,000,000, 2,500,000, 2,000,000, 1,500,000, 1,000,000, 950,000, 900,000, 850,000, 800,000, 750,000, 700,000, 650,000, 600,000, 550,000, 500,000, 450,000, 400,000, 350,000, 300,000, 250,000, 200,000, 150,000, and 100,000. In one embodiment, from the viewpoint of dispersion stability of slurry, 100,000 to 7,000,000 are preferable, and 350,000 to 6,000,000 are more preferable.

A number average molecular weight (Mn) of the component (A) is not particularly limited, and its upper limit and lower limit are, for example, 6,000,000, 5,500,000, 5,000,000, 4,500,000, 4,000,000, 3,500,000, 3,000,000, 2,500,000, 2,000,000, 1,500,000, 1,000,000, 950,000, 900,000, 850,000, 800,000, 750,000, 700,000, 650,000, 600,000, 550,000, 500,000, 450,000, 400,000, 300,000, 200,000, 100,000, 50,000, and 10,000. In one embodiment, the number average molecular weight (Mn) of the component (A) is preferably 10,000 or more.

The weight average molecular weight and the number average molecular weight may be calculated, for example, as values in terms of polyacrylic acid as measured by gel permeation chromatography (GPC) in an appropriate solvent.

The upper limit and lower limit of a molecular weight distribution (Mw/Mn) of the component (A) are, for example, 15, 14, 13, 11, 10, 9, 7.5, 5, 4, 3, 2.9, 2.5, 2, 1.5, and 1.1. In one embodiment, the molecular weight distribution (Mw/Mn) of the component (A) is preferably 1.1 to 15.

B-type viscosity of an aqueous solution containing 13% by mass of the component (A) is not particularly limited, and its upper limit and lower limit are, for example, 100,000 mPa·s, 90,000 mPa·s, 80,000 mPa·s, 70,000 mPa·s, 60,000 mPa·s, 50,000 mPa·s, 45,000 mPa·s, 40,000 mPa·s, 30,000 mPa·s, 20,000 mPa·s, 10,000 mPa·s, 9,000 mPa·s, 8,000 mPa·s, 7,000 mPa·s, 6,000 mPa·s, 5,000 mPa·s, 4,000 mPa·s, 3,000 mPa·s, 2,000 mPa·s, 1,000 mPa·s, 900 mPa·s, 700 mPa·s, 500 mPa·s, 300 mPa·s, 200 mPa·s, and 100 mPa·s. In one embodiment, the above B-type viscosity preferably ranges from 100 mPa·s to 100,000 mPa·s.

The B-type viscosity is measured by a B-type viscometer such as "B-type Viscometer Model BM" (product name) made by Toki Sangyo Co., Ltd.

The upper limit and lower limit of the pH of the binder aqueous solution for a lithium-ion battery are, for example, 9, 8.9, 8.5, 8, 7.9, 7.5, 7, 6.9, 6.5, 6, 5.9, 5.6, 5.5, 5.4, 5.2, 5.1, 5, and 4. In one embodiment, the pH of the binder aqueous solution for a lithium-ion battery is preferably 4 to 9 and more preferably 4 to 7 from the viewpoint of solution stability.

The pH may be measured at 25° C. using a glass electrode pH meter (for example, "Handy pH Meter D-52" (product name) made by Horiba, Ltd.).

The upper limit and lower limit of the content of the component (A) with respect to 100% by mass of the binder aqueous solution for a lithium-ion battery are, for example, 20% by mass, 19% by mass, 15% by mass, 14% by mass, 12% by mass, 10% by mass, 9% by mass, 7% by mass, 6% by mass, and 5% by mass. In one embodiment, the content of the component (A) with respect to 100% by mass of the binder aqueous solution for a lithium-ion battery is preferably 5% by mass to 20% by mass.

The upper limit and lower limit of the content of water with respect to 100% by mass of the binder aqueous solution for a lithium-ion battery are, for example, 95% by mass, 90% by mass, 85% by mass, and 80% by mass. In one embodiment, the content of the water with respect to 100% by mass of the binder aqueous solution for a lithium-ion battery is preferably 80% by mass to 95% by mass.

The upper limit and lower limit of a mass ratio between the component (A) and the water contained in the binder aqueous solution for a lithium-ion battery are, for example, 0.25, 0.2, 0.15, 0.1, and 0.05. In one embodiment, the mass ratio between the component (A) and the water contained in the binder aqueous solution for a lithium-ion battery is preferably 0.05 to 0.25.

<Dispersion (Emulsion)>

In one embodiment, the above binder aqueous solution for a lithium-ion battery contains a dispersion (emulsion).

Examples of the dispersion (emulsion) include styrene-butadiene-based copolymer latex, polystyrene-based polymer latex, polybutadiene-based polymer latex, acrylonitrile-butadiene-based copolymer latex, polyurethane-based polymer latex, polymethylmethacrylate-based polymer latex, methylmethacrylate-butadiene-based copolymer latex, polyacrylate-based polymer latex, vinyl chloride-based polymer latex, vinyl acetate-based polymer emulsion, vinyl acetate-ethylene-based copolymer emulsion, polyethylene emulsion, carboxy-modified styrene-butadiene copolymer resin emulsion, acrylic resin emulsion, polyethylene, polypropylene, polyethylene terephthalate, polyamide (PA), polyimide (PI), polyamide-imide (PAI), an aromatic polyamide, alginic acid and a salt thereof, polyvinylidene fluoride (PVDF), polytetrafluoroethylene (PTFE), a tetrafluoroethylene-hexafluoropropylene copolymer (FEP), a tetrafluoroethylene-perfluoroalkyl vinyl ether copolymer (PFA), and an ethylene tetrafluoroethylene (ETFE) copolymer.

The upper limit and lower limit of the content of the dispersion (emulsion) with respect to 100% by mass of the component (A) are, for example, 50% by mass, 45% by mass, 40% by mass, 35% by mass, 30% by mass, 25% by mass, 20% by mass, 19% by mass, 17% by mass, 15% by mass, 13% by mass, 10% by mass, 9% by mass, 7% by mass, 5% by mass, 4% by mass, 2% by mass, 1% by mass, and 0% by mass. In one embodiment, from the viewpoints of springback resistance and discharge capacity retention rate, the amount of the dispersion (emulsion) added with respect to 100% by mass of the component (A) is preferably 0% by mass to 50% by mass.

<Additive>

The binder aqueous solution for a lithium-ion battery may contain, as an additive, a component that does not correspond to any of the component (A), water, and the dispersion (emulsion).

Examples of the additive include a dispersant, a leveling agent, an antioxidant, and a thickener.

The content of the additive is, for example, 0% by mass to 5% by mass, less than 1% by mass, less than 0.1% by mass, less than 0.01% by mass, or 0% by mass, with respect to 100% by mass of the component (A). In one embodiment, the content of the additive is preferably 5% by mass or less with respect to 100% by mass of the component (A) from the viewpoint that haze is generated in the binder when the content exceeds 5% by mass.

In addition, the content of the additive is, for example, 0% by mass to 5% by mass, less than 1% by mass, less than 0.1% by mass, less than 0.01% by mass, or 0% by mass, with respect to 100% by mass of the above aqueous solution.

Examples of the dispersant include an anionic dispersant, a cationic dispersant, a nonionic dispersant, and a polymer dispersant.

Examples of the leveling agent include a surfactant, such as an alkyl-based surfactant, a silicon-based surfactant, a fluorine-based surfactant, and a metal-based surfactant. By using the surfactant, cissing that occurs during coating may be prevented and smoothness of a slurry layer (coating layer) may be improved.

Examples of the antioxidant include a phenol compound, a hydroquinone compound, an organophosphorus compound, a sulfur compound, a phenylenediamine compound, and a polymer type phenol compound. The polymer type phenol compound is a polymer having a phenol structure in a molecule. A weight average molecular weight of the polymer type phenol compound is preferably 200 to 1,000, more preferably 600 to 700.

Examples of the thickener include: a cellulosic polymer, such as carboxymethyl cellulose, methyl cellulose, and hydroxypropyl cellulose, as well as an ammonium salt and an alkali metal salt thereof; (modified) poly(meth)acrylic acid as well as an ammonium salt and an alkali metal salt thereof; polyvinyl alcohols, such as (modified) polyvinyl alcohol, a copolymer of acrylic acid or acrylate and vinyl alcohol, a copolymer of maleic anhydride, maleic acid, or fumaric acid and vinyl alcohol; polyethylene glycol, polyethylene oxide, polyvinylpyrrolidone, modified polyacrylic acid, oxidized starch, phosphoric acid starch, casein, various modified starches, and an acrylonitrile-butadiene copolymer hydride.

The binder aqueous solution for a lithium-ion battery may be used as a binder aqueous solution for a lithium-ion battery electrode, or a binder aqueous solution for a lithium-ion battery negative electrode.

[Slurry for Lithium-Ion Battery Negative Electrode: Also Referred to as Slurry]

The disclosure provides a slurry for a lithium-ion battery negative electrode, the slurry containing the above binder aqueous solution for a lithium-ion battery and a negative electrode active material (B).

In the disclosure, "slurry" means a suspension of liquid and solid particles.

The upper limit and lower limit of the content of the component (A) with respect to 100% by mass of the above slurry are, for example, 99.9% by mass, 95% by mass, 90% by mass, 80% by mass, 70% by mass, 60% by mass, 50% by mass, 40% by mass, 30% by mass, 20% by mass, 10% by mass, 5% by mass, 1% by mass, 0.5% by mass, 0.2% by mass, and 0.1% by mass. In one embodiment, the content of the component (A) is preferably 0.1% by mass to 99.9% by mass with respect to 100% by mass of the above slurry.

Examples of the water include ultrapure water, pure water, distilled water, ion-exchanged water, and tap water.

The upper limit and lower limit of the content of the water with respect to 100% by mass of the above slurry are, for example, 70% by mass, 65% by mass, 60% by mass, 55% by mass, 50% by mass, 45% by mass, 40% by mass, 35% by mass, and 30% by mass. In one embodiment, the content of the water is preferably 30% by mass to 70% by mass with respect to 100% by mass of the above slurry.

<Negative Electrode Active Material (B): Also Referred to as Component (B)>

A negative electrode active material may be used singly or in combination of two or more.

The negative electrode active material is not particularly limited as long as being capable of reversibly occluding and releasing lithium, and an appropriate material may be suitably selected depending on the type of the target lithium-ion battery. The negative electrode active material may be used singly or in combination of two or more. Examples of the negative electrode active material include a carbon material, as well as a material alloyable with lithium, such as a silicon material, a lithium atom-containing oxide, a lead compound, a tin compound, an arsenic compound, an antimony compound, and an aluminum compound.

Examples of the above carbon material include graphite (for example, natural graphite and artificial graphite) which is highly crystalline carbon, low crystalline carbon (such as soft carbon and hard carbon), carbon black (such as Ketjen black, acetylene black, channel black, lamp black, oil furnace black, and thermal black), a fullerene, a carbon nanotube, a carbon nanofiber, a carbon nanohorn, a carbon fibril, mesocarbon microbeads (MCMB), and a pitch-based carbon fiber.

Examples of the above silicon material include, in addition to silicon, silicon oxide and silicon alloy, silicon oxide composites expressed by SiC, $SiO_xC_y$ (in which $0<x\leq3$, and $0<y\leq5$), $Si_3N_4$, $Si_2N_2O$, and $SiO_x$ (in which $0<x\leq2$) (for example, materials described in Japanese Patent Laid-Open Nos. 2004-185810 and 2005-259697), and a silicon material described in Japanese Patent Laid-Open No. 2004-185810. In addition, silicon materials described in Japanese Patent Nos. 5390336 and 5903761 may also be used.

The above silicon oxide is preferably a silicon oxide expressed by a composition formula $SiO_x$ (in which $0<x<2$, preferably $0.1\leq x\leq1$).

The above silicon alloy is preferably an alloy of silicon and at least one transition metal selected from the group consisting of titanium, zirconium, nickel, copper, iron and molybdenum. Silicon alloys of these transition metals are preferable due to high electronic conductivity and high strength. The silicon alloy is more preferably a silicon-nickel alloy or a silicon-titanium alloy, particularly preferably a silicon-titanium alloy. A content ratio of silicon in the silicon alloy is preferably 10 mol % or more, more preferably 20 mol % to 70 mol %, with respect to 100 mol % of metal elements in the above silicon alloy. The silicon material may be single crystalline, polycrystalline, or amorphous.

When the silicon material is used as the negative electrode active material, a negative electrode active material other than the silicon material may be used together. Examples of such a negative electrode active material include the above carbon material; a conductive polymer such as polyacene; a composite metal oxide expressed by $A_xB_yO_z$ (in which A represents an alkali metal or a transition metal, B represents at least one selected from transition metals such as cobalt, nickel, aluminum, tin, and manganese, O represents an oxygen atom, and X, Y, and Z are respectively numbers in the following ranges: $0.05<X<1.10$, $0.85<Y<4.00$ and $1.5<Z<5.00$), or other metal oxide. When the silicon material is used as the negative electrode active material, it is preferable to use a carbon material together because a volume change associated with the occlusion and release of lithium is small.

Examples of the above lithium atom-containing oxide include a ternary nickel cobalt lithium manganate, a lithium-transition metal composite oxide, such as a lithium-manganese composite oxide (such as $LiMn_2O_4$), a lithium-nickel composite oxide (such as $LiNiO_2$), a lithium-cobalt composite oxide (such as $LiCoO_2$), a lithium-iron composite oxide (such as $LiFeO_2$), a lithium-nickel-manganese composite oxide (such as $LiNi_{0.5}Mn_{0.5}O_2$), a lithium-nickel-cobalt composite oxide (such as $LiNi_{0.8}Co_{0.2}O_2$), a lithium-transition metal phosphate compound (such as $LiFePO_4$), a lithium-transition metal sulfate compound (such as $Li_xFe_2(SO_4)_3$), a lithium-titanium composite oxide (such as lithium titanate: $Li_4Ti_5O_{12}$), and other conventionally known negative electrode active materials.

From the viewpoint of remarkably exhibiting the effect of the disclosure, the carbon material and/or the material alloyable with lithium is preferably contained in the negative electrode active material in an amount of 50% by mass or more, more preferably 80% by mass or more, further preferably 90% by mass or more, and particularly preferably 100% by mass.

In one embodiment, the negative electrode active material (B) is preferably a negative electrode active material containing 1% by mass or more (for example, 2% by mass or more, 5% by mass or more, 10% by mass or more, 25% by mass or more, 50% by mass or more, 75% by mass or more, 90% by mass or more, or 100% by mass) of silicon and/or a silicon oxide covered with a carbon layer.

The shape of the negative electrode active material is not particularly limited and may be an arbitrary shape such as a fine particle shape or a thin film shape, and a fine particle shape is preferable. An average particle diameter of the negative electrode active material is not particularly limited, and its upper limit and lower limit are, for example, 50 μm, 45 μm, 40 μm, 35 μm, 30 μm, 25 μm, 20 μm, 15 μm, 10 μm, 5 μm, 4 μm, 3 μm, 2.9 μm, 2 μm, 1 μm, 0.5 μm, and 0.1 μm. In one embodiment, from the viewpoint of forming a uniform and thin coating film, more specifically, for the reason that handleability is good if the average particle diameter is 0.1 μm or more and application of an electrode is easy if the average particle diameter is 50 μm or less, the average particle diameter of the negative electrode active material is preferably 0.1 μm to 50 μm, more preferably 0.1 μm to 45 μm, further preferably 1 μm to 10 μm, and particularly preferably 5 μm.

In the disclosure, "particle diameter" means a maximum distance among distances between arbitrary two points on a contour line of a particle (the same applies hereinafter). In addition, in the disclosure, unless otherwise specified, "average particle diameter" means a value calculated as an average value of particle diameters of particles observed in several to several tens of visual fields using an observation means such as a scanning electron microscope (SEM) or a transmission electron microscope (TEM) (the same applies hereinafter).

The upper limit and lower limit of the content of the component (A) in the above slurry with respect to 100% by mass of the negative electrode active material (B) are, for example, 15% by mass, 14% by mass, 13% by mass, 12% by mass, 11% by mass, 10% by mass, 9% by mass, 8% by mass, 7% by mass, 6% by mass, 5% by mass, 4% by mass, 3% by mass, 2% by mass, 1.5% by mass, 1% by mass, and 0.5 mass %. In one embodiment, the above content is preferably 0.5% by mass to 15% by mass.

<Conductive Aid>

In one embodiment, a conductive aid may be contained in the above slurry. Examples of the conductive aid include fibrous carbon such as vapor grown carbon fiber (VGCF), a carbon nanotube (CNT) and carbon nanofiber (CNF), carbon black such as graphite particles, acetylene black, Ketjen black and furnace black, and fine powders of Cu, Ni, Al, Si or alloys thereof having an average particle diameter of 10 μm or less. The content of the conductive aid is not particularly limited, and is preferably 0% by mass to 10% by mass, more preferably 0.5% by mass to 6% by mass, with respect to the negative electrode active material component.

<Slurry Viscosity Adjustment Solvent>

A slurry viscosity adjustment solvent is not particularly limited, and may include a non-aqueous medium having a normal boiling point of 80° C. to 350° C. The slurry viscosity adjustment solvent may be used singly or in combination of two or more. Examples of the slurry viscosity adjustment solvent include: an amide solvent, such as N-methylpyrrolidone, dimethylformamide, and N,N-dimethylacetamide; a hydrocarbon solvent, such as toluene, xylene, n-dodecane, and tetralin; an alcohol solvent, such as methanol, ethanol, 2-propanol, isopropyl alcohol, 2-ethyl-1-hexanol, 1-nonanol, and lauryl alcohol; a ketone solvent, such as acetone, methyl ethyl ketone, cyclohexanone, phorone, acetophenone, and isophorone; an ether solvent, such as dioxane and tetrahydrofuran (THF); an ester solvent, such as benzyl acetate, isopentyl butyrate, methyl lactate, ethyl lactate, and butyl lactate; an amine solvent, such as o-toluidine, m-toluidine, and p-toluidine; a lactone, such as γ-butyrolactone and δ-butyrolactone; a sulfoxide and sulfone solvent, such as dimethyl sulfoxide and sulfolane; and water. Among them, N-methylpyrrolidone is preferable from the viewpoint of application workability. The content of the above non-aqueous medium is not particularly limited, and is preferably 0% by mass to 10% by mass with respect to 100% by mass of the above slurry.

The above slurry may contain, as an additive, a component that does not correspond to any of the component (A), the component (B), water, the conductive aid, and the slurry viscosity adjustment solvent without impairing the effects of the disclosure. Examples of the additive include those described above.

The content of the additive is, for example, 0% by mass to 5% by mass, less than 1% by mass, less than 0.1% by mass, less than 0.01% by mass, or 0% by mass, with respect to 100% by mass of the component (A).

The content of the additive with respect to 100% by mass of the component (B) is, for example, 0% by mass to 5% by mass, less than 1% by mass, less than 0.1% by mass, less than 0.01% by mass, or 0% by mass.

Moreover, the dispersion (emulsion) may be contained in a larger amount than the above additive content. The upper limit and lower limit of the content of the dispersion (emulsion) with respect to 100% by mass of the slurry for a lithium-ion battery negative electrode are, for example, 20% by mass, 19% by mass, 17% by mass, 15% by mass, 13% by mass, 10% by mass, 9% by mass, 7% by mass, 5% by mass, 4% by mass, 2% by mass, 1% by mass, and 0% by mass. In one embodiment, from the viewpoints of springback resistance and discharge capacity retention rate, the amount of the dispersion (emulsion) added with respect to 100% by mass of the above aqueous solution or the slurry for a lithium-ion battery negative electrode is preferably less than 5% by mass.

The above slurry is prepared by mixing the component (A), the component (B), water, and if necessary, the conductive aid and the slurry viscosity adjustment solvent.

Examples of a means of mixing the slurry include a ball mill, a sand mill, a pigment disperser, a Raikai mixer, an ultrasonic disperser, a homogenizer, a planetary mixer, and a Hobart mixer.

[Lithium-Ion Battery Negative Electrode]

The disclosure provides a negative electrode for a lithium-ion battery, obtained by applying the above slurry for a lithium-ion battery negative electrode to a current collector, and drying and curing the slurry. The above lithium-ion battery negative electrode has a cured product of the above slurry for a lithium-ion battery negative electrode on a surface of the current collector.

As the current collector, various known ones may be used without particular limitation. A material of the current collector is not particularly limited, and examples thereof include a metal material, such as copper, iron, aluminum, nickel, stainless steel, and nickel-plated steel, or a carbon material, such as carbon cloth and carbon paper. The form of the current collector is not particularly limited. In the case of metal material, examples thereof include a metal foil, a metal cylinder, a metal coil, and a metal plate; in the case of carbon material, examples thereof include a carbon plate, a carbon thin film, and a carbon cylinder. Among them, when an electrode active material is used in the negative electrode, a copper foil is preferably used as the current collector because it is currently used in industrialized products.

The application means is not particularly limited, and examples thereof include a conventionally known coating device, such as a comma coater, a gravure coater, a micro gravure coater, a die coater, and a bar coater.

The drying means is also not particularly limited, and the temperature is preferably 60° C. to 200° C., more preferably 100° C. to 195° C. The atmosphere may be dry air or an inert atmosphere.

The thickness of the negative electrode (cured product) is not particularly limited, and is preferably 5 μm to 300 μm, more preferably 10 μm to 250 μm. By setting the above range, a function of occluding and releasing sufficient lithium with respect to a high-density current value may be easily obtained.

[Lithium-Ion Battery]

The disclosure provides a lithium-ion battery including the above negative electrode for a lithium-ion battery. In one embodiment, the above battery includes an electrolyte solution, a separator, a positive electrode and so on. The above are not particularly limited.

Examples of the electrolyte solution include non-aqueous electrolytic solution in which a supporting electrolyte is dissolved in a non-aqueous solvent. In addition, a film forming agent may be contained in the above non-aqueous electrolytic solution.

As the non-aqueous solvent, various known ones may be used without particular limitation, and may be used singly or in combination of two or more. Examples of the non-aqueous solvent include: a chain carbonate solvent, such as diethyl carbonate, dimethyl carbonate, and ethyl methyl carbonate; a cyclic carbonate solvent, such as ethylene carbonate, propylene carbonate, and butylene carbonate; a chain ether solvent, such as 1,2-dimethoxyethane; a cyclic ether solvent, such as tetrahydrofuran, 2-methyltetrahydrofuran, sulfolane, and 1,3-dioxolane; a chain ester solvent, such as methyl formate, methyl acetate, and methyl propionate; a cyclic ester solvent, such as γ-butyrolactone and γ-valerolactone; and acetonitrile. Among them, a combination of mixed solvents containing a cyclic carbonate and a chain carbonate is preferable.

A lithium salt is used as the supporting electrolyte. As the lithium salt, various known ones may be used without particular limitation, and may be used singly or in combination of two or more. Examples of the supporting electrolyte include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)_2NLi$. Among them, $LiPF_6$, $LiClO_4$ and $CF_3SO_3Li$, which are easily dissolved in a solvent and exhibit a high dissociation degree, are preferable. The higher the dissociation degree of the supporting electrolyte, the higher the lithium-ion conductivity. Therefore, the lithium-ion conductivity can be adjusted according to the type of the supporting electrolyte.

As the film forming agent, various known ones may be used without particular limitation, and may be used singly or in combination of two or more. Examples of the film forming agent include: a carbonate compound, such as vinylene carbonate, vinyl ethylene carbonate, vinyl ethyl carbonate, methylphenyl carbonate, fluoroethylene carbonate, and difluoroethylene carbonate; an alkene sulfide, such as ethylene sulfide and propylene sulfide; a sultone compound, such as 1,3-propane sultone and 1,4-butane sultone; and an acid anhydride, such as maleic anhydride and succinic anhydride. The content of the film forming agent in the electrolyte solution is not particularly limited, and is 10% by mass or less, 8% by mass or less, 5% by mass or less, or 2% by mass or less, in order of preference. By setting the content to 10% by mass or less, the advantages of the film forming agent, such as suppression of initial irreversible capacity or improvement in low temperature characteristics and rate characteristics, may be easily achieved.

The separator is an article interposed between a positive electrode and a negative electrode, and is used to prevent a short circuit between the electrodes. Specifically, a porous separator such as a porous film or a nonwoven fabric may be preferably used, which is impregnated with the aforementioned non-aqueous electrolytic solution for use. As a material of the separator, a polyolefin such as polyethylene and polypropylene, or polyethersulfone, is used, and polyolefin is preferable.

As the positive electrode, various known ones may be used without particular limitation. Examples of the positive electrode include one obtained by preparing a slurry by mixing a positive electrode active material, a conductive aid, and a binder for a positive electrode with an organic solvent, applying the prepared slurry to a positive electrode current collector and drying and pressing.

Examples of the positive electrode active material include an inorganic positive electrode active material and an organic positive electrode active material. Examples of the inorganic positive electrode active material include a transition metal oxide, a composite oxide of lithium and a transition metal, and a transition metal sulfide. Examples of the above transition metal include Fe, Co, Ni, Mn, and Al. Examples of the inorganic compound used in the positive electrode active material include: a lithium-containing composite metal oxide, such as $LiCoO_2$, $LiNiO_2$, $LiMnO_2$, $LiMn_2O_4$, $LiFePO_4$, $LiNi_{1/2}Mn_{3/2}O_4$, $LiCo_{1/3}Ni_{1/3}Mn_{1/3}O_2$, $Li[Li_{0.1}Al_{0.1}Mn_{1.8}]O_4$, and $LiFeVO_4$; a transition metal sulfide, such as $TiS_2$, $TiS_3$, and amorphous $MoS_2$; and a transition metal oxide, such as $Cu_2V_2O_3$, amorphous $V_2O$—$P_2O_5$, $MoO_3$, $V_2O_5$, and $V_6O_{13}$. These compounds may be partially element-substituted. Examples of the organic positive electrode active material include a conductive polymer, such as polyacetylene and poly-p-phenylene. An iron-based oxide having poor electric conductivity may be used as an electrode active material covered with a carbon material by allowing a carbon source material to exist during reduction firing. These compounds may be partially element-substituted. Among them, from the viewpoints of practicality, electrical characteristics and long life, $LiCoO_2$, $LiNiO_2$, $LiMnO_2$, $LiMn_2O_4$, $LiFePO_4$, $LiNi_{1/2}Mn_{3/2}O_4$, $LiCo_{1/3}Ni_{1/3}Mn_{1/3}O_2$, and $Li[Li_{0.1}Al_{0.1}Mn_{1.8}]O_4$ are preferable.

Examples of the conductive aid include fibrous carbon such as vapor grown carbon fiber (VGCF), a carbon nanotube (CNT) and carbon nanofiber (CNF), carbon black such as graphite particles, acetylene black, Ketjen black and furnace black, and fine powders of Cu, Ni, Al, Si or alloys thereof having an average particle diameter of 10 μm or less.

As the binder for a positive electrode, various known ones may be used without particular limitation, and may be used singly or in combination of two or more thereof. Examples of the binder for a positive electrode include a fluorine-based resin (such as polyvinylidene fluoride and polytetrafluoroethylene), a polyolefin (such as polyethylene and polypropylene), a polymer having an unsaturated bond (such as styrene-butadiene rubber, isoprene rubber, and butadiene rubber), and an acrylic acid-based polymer (such as an acrylic acid copolymer and a methacrylic acid copolymer).

Examples of the positive electrode current collector include an aluminum foil and a stainless steel foil.

The form of the above lithium-ion battery is not particularly limited. Examples of the form of the lithium-ion battery include a cylinder type in which a sheet electrode and a separator are formed in a spiral shape, a cylinder type having an inside-out structure in which a pellet electrode and a separator are combined, and a coin type in which a pellet electrode and a separator are laminated. In addition, by accommodating the battery of these forms in an arbitrary exterior case, the battery can be used in an arbitrary shape such as a coin shape, a cylindrical shape, and a square shape.

A method for producing the above lithium-ion battery is not particularly limited, and the lithium-ion battery may be assembled by an appropriate procedure depending on the structure of the battery. Examples of the method for producing a lithium-ion battery include a method described in Japanese Patent Laid-Open No. 2013-089437. The battery can be produced in the following manner. A negative electrode is placed on an exterior case, an electrolytic solution and a separator are provided thereon, a positive electrode is further placed so as to face the negative electrode, and the positive electrode is fixed with a gasket and a sealing plate.

EXAMPLES

Hereinafter, the disclosure will be specifically described through examples and comparative examples. However, the above description of the preferred embodiments and the following examples are provided for illustration only and not for limiting the disclosure. Therefore, the scope of the disclosure is not limited to the embodiments or examples specifically described herein, but only by the claims. In addition, in each of the examples and comparative examples, unless otherwise specified, numerical values such as part and % are based on mass.

Preparation of Component (A)

Preparation Example 1

In a reactor equipped with a stirrer, a thermometer, a reflux condenser and a nitrogen gas introduction pipe, 1,240 g of ion-exchanged water, 350 g (2.46 mol) of 50% acrylamide aqueous solution, 56.6 g (0.43 mol) of 2-methoxyethyl acrylate, and 0.23 g (0.0014 mol) of sodium methallyl sulfonate were put, and after oxygen in the reaction system was removed through nitrogen gas, the resultant was heated to 55° C. 2.1 g of 2,2'-azobis-2-amidinopropane dihydrochloride (product name "NC-32" made by NIPPOH CHEMICALS CO., LTD.) and 20 g of ion-exchanged water were put therein, and the resultant was heated to 80° C. and reacted for 3 hours. Ion-exchanged water was added so as to achieve a solid content concentration of 13%, and a binder aqueous solution containing a water-soluble poly(meth)acrylamide was obtained. The B-type viscosity of this solution at 25° C. was 10,000 mPa·s.

In Preparation Examples 2 to 4, a binder aqueous solution containing a water-soluble poly(meth)acrylamide was prepared in the same manner as in Preparation Example 1 except that the monomer composition was changed to those shown in the following table.

Preparation Example 5

In a reactor equipped with a stirrer, a thermometer, a reflux condenser and a nitrogen gas introduction pipe, 1,170 g of ion-exchanged water, 120 g (0.84 mol) of 50% acrylamide aqueous solution, 12 g (0.12 mol) of N,N-dimethylacrylamide, 62.8 g (0.48 mol) of 2-methoxyethyl acrylate, 87 g (0.96 mol) of 80% acrylic acid and 0.19 g (0.0012 mol) of sodium methallyl sulfonate were put, and after oxygen in the reaction system was removed through nitrogen gas, the resultant was heated to 55° C. 1.8 g of 2,2'-azobis-2-amidinopropane dihydrochloride (product name "NC-32" made by NIPPOH CHEMICALS CO., LTD.) and 20 g of ion-exchanged water were put therein, and the resultant was heated to 80° C. and reacted for 3 hours. After that, 64.4 g (0.77 mol) of 48% sodium hydroxide aqueous solution as a neutralizer was added and stirred, ion-exchanged water was added so as to achieve a solid content concentration of 13%, and a binder aqueous solution containing a water-soluble (meth)polyacrylamide was obtained. The B-type viscosity of this solution at 25° C. was 12,000 mPa·s.

In Preparation Examples 6 to 7, a binder aqueous solution containing a water-soluble poly(meth)acrylamide was prepared in the same manner as in Preparation Example 5 except that the monomer composition and the amount of the neutralizer were changed to those shown in the following table.

Comparative Preparation Example 1

In a reactor equipped with a stirrer, a thermometer, a reflux condenser and a nitrogen gas introduction pipe, 1,280 g of ion-exchanged water, 500 g (3.52 mol) of 50% acrylamide aqueous solution, and 0.28 g (0.0018 mol) of sodium methallyl sulfonate were put, and after oxygen in the reaction system was removed through nitrogen gas, the resultant was heated to 55° C. 2.3 g of 2,2'-azobis-2-amidinopropane dihydrochloride (product name "NC-32" made by NIPPOH CHEMICALS CO., LTD.) and 20 g of ion-exchanged water were put therein, and the resultant was heated to 80° C. and reacted for 3 hours. After that, ion-exchanged water was added so as to achieve a solid content concentration of 13%, and a binder aqueous solution containing a water-soluble poly(meth)acrylamide was obtained. The B-type viscosity of this solution at 25° C. was 15,000 mPa·s.

In the comparative preparation examples other than Comparative Preparation Example 1, a binder aqueous solution containing a water-soluble poly(meth)acrylamide was prepared in the same manner as in Comparative Preparation Example 1 except that the monomer composition and the like in Comparative Preparation Example 1 were changed to those shown in the following table.

B-Type Viscosity

The viscosity of each binder aqueous solution was measured at 25° C. under the following conditions using a B-type viscometer (product name "B-type Viscometer Model BM" made by Toki Sangyo Co., Ltd.).

No. 3 rotor was used at a rotational speed of 6 rpm.

Weight Average Molecular Weight

The weight average molecular weight was calculated as a value in terms of polyacrylic acid as measured by gel permeation chromatography (GPC) under a 0.2 M phosphate buffer/acetonitrile solution (90/10, PH 8.0). HLC-8220 (made by Tosoh Corporation) was used as a GPC device, and SB-806M-HQ (made by SHODEX) was used as a column.

TABLE 2

| | (Meth)acrylamide group-containing compound (a) | | Alkoxyalkyl (meth)acrylate (b) | | | Unsaturated organic acid or salt thereof (c) | | Hydroxyalkyl-(meth)-acrylate (d) having hydroxyalkyl group having 2 to 4 carbon atoms | α,β-unsaturated nitrile (e) | Other components | Neutralizer (amount with respect to acid component) | B-type viscosity (mPa·s) | Molecular weight (Mw) |
|---|---|---|---|---|---|---|---|---|---|---|---|---|---|
| | AM (mol %) | DMAA (mol %) | MEA (mol %) | MMEA (mol %) | MEEA (mol %) | AA (mol %) | SMAS (mol %) | HEA (mol %) | AN (mol %) | BA (mol %) | NaOH (mol %) | | |
| Preparation Example 1 | 84.95 | — | 15 | — | — | — | 0.05 | — | — | — | — | 10,000 | 550,000 |
| Preparation Example 2 | 69.95 | — | 30 | — | — | — | 0.05 | — | — | — | — | 5,000 | 500,000 |
| Preparation Example 3 | 84.95 | — | — | 15 | — | — | 0.05 | — | — | — | — | 7,000 | 500,000 |
| Preparation Example 4 | 84.95 | — | — | — | 15 | — | 0.05 | — | — | — | — | 6,000 | 500,000 |
| Preparation Example 5 | 34.95 | 5 | 20 | — | — | 40 | 0.05 | — | — | — | 80 | 12,000 | 850,000 |
| Preparation Example 6 | 45 | — | 15 | — | — | 35 | 0.10 | 5 | — | — | 90 | 3,000 | 600,000 |
| Preparation Example 7 | 60 | — | 6 | — | — | 20 | — | — | 14 | — | 80 | 10,000 | 700,000 |
| Comparative Preparation Example 1 | 99.95 | — | — | — | — | — | 0.05 | — | — | — | — | 15,000 | 600,000 |
| Comparative Preparation Example 2 | 39.95 | — | 60 | — | — | — | 0.05 | — | — | — | — | Insolubilized (separated into two phases) | — |
| Comparative Preparation Example 3 | — | — | 20 | — | — | 79.95 | 0.05 | — | — | — | 90 | 2,000 | 400,000 |
| Comparative Preparation Example 4 | 79.9 | — | — | — | — | — | 0.10 | 20 | — | — | — | 4,000 | 500,000 |
| Comparative Preparation Example 5 | 79.95 | — | — | — | — | — | 0.05 | — | — | 20 | — | Insolubilized (separated into two phases) | — |

AM: Acrylamide ("50% Acrylamide" made by Mitsubishi Chemical Corporation)
DMAA: N,N-dimethylacrylamide ("DMAA" made by KJ Chemicals Corporation)
MEA: 2-methoxyethyl acrylate ("2-MTA" made by Osaka Organic Chemical Industry Ltd.)
MMEA: 2-methoxyethyl methacrylate ("2-Methoxyethyl Methacrylate" made by Tokyo Chemical Industry Co., Ltd.)
MEEA: 2-ethoxyethyl methacrylate ("2-Ethoxyethyl Methacrylate" made by Tokyo Chemical Industry Co., Ltd.)
AA: Acrylic acid ("80% Acrylic Acid" made by Osaka Organic Chemical Industry Ltd.)
HEA: 2-hydroxyethyl acrylate ("HEA" made by Osaka Organic Chemical Industry Ltd.)
AN: Acrylonitrile ("Acrylonitrile" made by Mitsubishi Chemical Corporation)
BA: Butyl acrylate ("Butyl Acrylate" made by Toagosei Company, Limited)
SMAS: Sodium methallyl sulfonate
NaOH: Sodium hydroxide ("48% Sodium Hydroxide Solution" made by Kanto Chemical Co., Inc.)

Preparation of Slurry, and Cell Production and Evaluation

Example 1

<Preparation of Slurry for Electrode>

A slurry was prepared using a commercially available homodisper ("Homodisper Model 2.5" made by PRIMIX Corporation). In a mayonnaise bottle as a container, the binder aqueous solution for a lithium-ion battery as obtained in Preparation Example 1, which contained the water-soluble poly(meth)acrylamide (A), was mixed in an amount of 5 parts by mass in terms of solid content with 20 parts by mass of silicon monoxide particles ("CC Powder" made by OSAKA Titanium technologies Co., Ltd.) having a D50 (median diameter) of 5 μm, 80 parts by mass of artificial graphite ("G1-A#" made by Jiangxi Zichen Technology Co., Ltd.) having a D50 (median diameter) of 20 μm, and 1 part by mass of a conductive aid ("Super C65" made by Imerys Graphite & Carbon Japan K.K.). Ion-exchanged water was added thereto so as to achieve a solid content concentration of 47%, and the container was set in the above homodisper. Next, the resultant was kneaded at 3,000 rpm for 10 minutes. After that, the resultant was subjected to defoaming for 1 minute using a rotation/revolution mixer ("Awatori Rentaro" made by THINKY CORPORATION), and a slurry for an electrode was obtained.

In the examples other than Example 1 and the comparative examples, a slurry was prepared in the same manner as in Example 1 except that the composition in Example 1 was changed to those shown in the following table.

<Test for Storage Stability of Electrode Slurry>

The storage stability of the electrode slurry was evaluated as follows.

The viscosity (unit: mPa·s) of the electrode slurry was measured by a B-type viscometer and then stored in an oven heated to 40° C. for 3 days. After storage, the viscosity was measured again by the B-type viscometer. A change in viscosity was calculated by the following equation and was evaluated according to the following evaluation criteria.

Change in viscosity (%)={(viscosity of electrode slurry after storage)/(viscosity of electrode slurry before storage)}×100

A: Less than 110%
B: 110% or more and less than 120%
C: 120% or more and less than 130%
D: 130% or more <Evaluation of Electrode Flexibility>

The electrode flexibility was evaluated as follows.

The above slurry for a lithium-ion battery was uniformly applied to a surface of a current collector (20 μm) composed of copper foil by a doctor blade method so that a film thickness after drying would be 170 μm, then subjected to heating and drying at 150° C. for 15 minutes, and an electrode was obtained. The obtained electrode was cut into a width of 10 mm and a length of 70 mm, and was wound around a Teflon™ rod having a diameter of 30 mmØ with an active material layer facing outward. A state of a surface of the active material layer was observed and evaluated according to the following criteria.

A: No cracks and peeling occurred at all in the active material layer bound on the current collector.
B: Cracks were seen in the active material layer bound on the current collector, but no peeling was observed.
C: Cracks were seen and peeling was observed in the active material layer bound on the current collector.

<Evaluation of Electrode Adhesion>

The electrode adhesion was evaluated as follows.

The above slurry for a lithium-ion battery was uniformly applied to a surface of a current collector (20 μm) composed of copper foil by a doctor blade method so that a film thickness after drying would be 170 μm. After drying at 150° C. for 30 minutes, the resultant was subjected to a heating treatment at 150° C. in vacuum for 120 minutes. After that, by press processing with a roll press machine to achieve a film (electrode active material layer) density of 1.5 g/cm³, an electrode was obtained. A test piece of 2 cm in width×10 cm in length was cut out from the obtained electrode and fixed with a coating surface facing up. Next, an adhesive tape ("CELLOTAPE™" made by NICHIBAN Co., Ltd.) (specified in JIS Z1522) of 15 mm in width was attached while being pressed onto a surface of an active material layer of the test piece, and then the stress when the adhesive tape was peeled off from one end of the test piece at a speed of 30 mm/min in the 180° direction was measured using a tensile tester ("TENSILON RTM-100" made by A&D Company, Limited) at 25° C. The measurement was performed twice, the measured stress was converted into a value per width of 15 mm, and an average value thereof was calculated as peel strength. The higher the peel strength, the higher the adhesion strength between the current collector and the active material layer or the binding property between the active materials, indicating that the active material layer is less likely to be peeled from the current collector or the active materials are less likely to be peeled from each other.

Ratings of the electrode adhesion are described in the table according to the following criteria.

AA: 41 N/m or more
A: 30 N/m to 40 N/m
B: 20 N/m to 30 N/m
C: Less than 20 N/m

<Assembly of Lithium Half-Cell>

The above slurry for a lithium-ion battery was uniformly applied to a surface of a current collector (20 μm) composed of copper foil by a doctor blade method so that a film thickness after drying would be 170 μm. After drying at 150° C. for 30 minutes, the resultant was subjected to a heating treatment at 150° C. in vacuum for 120 minutes. After that, by press processing with a roll press machine to achieve a film (electrode active material layer) density of 1.5 g/cm³, an electrode was obtained.

In an argon-purged glove box, the above electrode was punched and formed to have a diameter of 16 mm, and the resultant was placed inside a packing above an aluminum lower lid of a test cell (made by Nippon Tomcell Co., Ltd.). Next, a separator ("Selion P2010" made by CS Tech Co., Ltd.) composed of a polypropylene porous film punched out to a diameter of 24 mm was placed. Further, after 500 μL of electrolytic solution was poured in so that no air could enter, a commercially available metallic lithium foil punched and formed into a size of 16 mm was placed, and an exterior body of the test cell was fastened and sealed with screws. Thereby, a lithium half-cell was assembled. The electrolytic solution used here was a solution in which $LiPF_6$ was dissolved at a concentration of 1 mol/L in a solvent having a mass ratio of ethylene carbonate to ethyl methyl carbonate of 1/1.

<Charge and Discharge Measurement>

The lithium half-cell was put in a constant temperature bath set to 25° C. and underwent charging and discharging as follows. The charging was started at a constant current (0.1 C) and was completed (cutoff) when the voltage reached 0.01 V. Next, the discharging was started at a constant current (0.1 C) and was completed (cutoff) when the voltage reached 1.0 V. The above charging and discharging were repeated 30 times.

In the above measurement conditions, "1 C" indicates a current value at which a cell having a certain electric capacity is discharged at a constant current and the discharging is completed in 1 hour. For example, "0.1 C" means a current value at which it takes 10 hours to complete discharging, and "10 C" means a current value at which it takes 0.1 hour to complete discharging.

<Discharge Capacity Retention Rate>

The discharge capacity retention rate was calculated from the following equation.

Discharge capacity retention rate={(discharge capacity at 30th cycle)/(discharge capacity at 1st cycle)}×100(%)

Ratings of the discharge capacity retention rate are described in the table according to the following criteria.

AA: 90% or more
A: 80% to 89%
B: 70% to 79%
C: Less than 70%

TABLE 3

| | Negative electrode active material | | Binder | | | | | |
|---|---|---|---|---|---|---|---|---|
| | Artificial graphite | Silicon monoxide | aqueous solution | | Storage stability of | Electrode flexibility | Electrode adhesion | Discharge capacity retention rate |
| | Part by mass | Part by mass | Name | Part by mass | electrode slurry | | | |
| Example 1 | 80 | 20 | Preparation Example 1 | 5 | B | A | A | B |
| Example 2 | 80 | 20 | Preparation Example 2 | 5 | A | A | A | A |
| Example 3 | 80 | 20 | Preparation Example 3 | 5 | B | A | B | B |
| Example 4 | 80 | 20 | Preparation Example 4 | 5 | C | B | B | B |
| Example 5 | 80 | 20 | Preparation Example 5 | 5 | A | A | AA | A |
| Example 6 | 100 | 0 | Preparation Example 6 | 3 | A | B | A | AA |
| Example 7 | 80 | 20 | Preparation Example 7 | 5 | B | B | A | A |
| Comparative Example 1 | 80 | 20 | Comparative Preparation Example 1 | 5 | D | C | C | C |
| Comparative Example 2 | 80 | 20 | Comparative Preparation Example 2 | 5 | D | C | C | C |
| Comparative Example 3 | 80 | 20 | Comparative Preparation Example 3 | 5 | C | B | C | C |
| Comparative Example 4 | 80 | 20 | Comparative Preparation Example 4 | 5 | C | C | C | C |
| Comparative Example 5 | 80 | 20 | Comparative Preparation Example 5 | 5 | D | C | C | C |

What is claimed is:

1. A binder aqueous solution for a lithium-ion battery, containing:
   a water-soluble poly(meth)acrylamide (A) being a polymer of a monomer group containing with respect to 100 mol % of the monomer group,
   0.05 mol % to 0.10 mol % of (meth)allylsulfonic acid or a salt thereof,
   30 mol % to 95 mol % of a (meth)acrylamide group-containing compound (a), and
   an alkoxyalkyl (meth)acrylate (b) represented by general formula (1), $$CH_2=C(R^1)-CO-O-R^2-O-R^3 \quad (1)$$

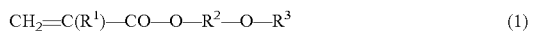

wherein $R^1$ is a hydrogen atom or a methyl group, $R^2$ is an ethylene group, $R^3$ is a methyl group, and
   wherein a content of the alkoxyalkyl (meth)acrylate (b) represented by general formula (1) is 20% by mass to 60% by mass with respect to 100% by mass of the monomer group.

2. A slurry for a lithium-ion battery negative electrode, containing the binder aqueous solution for a lithium-ion battery according to claim 1 and a negative electrode active material.

3. A negative electrode for a lithium-ion battery, obtained by applying the slurry for a lithium-ion battery negative electrode according to claim 2 to a current collector, and drying and curing the slurry.

4. A lithium-ion battery, comprising the negative electrode for a lithium-ion battery according to claim 3.

* * * * *